US009125115B2

(12) United States Patent
Kubota et al.

(10) Patent No.: US 9,125,115 B2
(45) Date of Patent: Sep. 1, 2015

(54) METHOD AND APPARATUS FOR ACCESSING WIRELESS NETWORK BY SHARING COMMUNICATION, AND WIRELESS TERMINAL DEVICE

(75) Inventors: Kazuo Kubota, Yokohama (JP); Junichi Asoh, Tokyo (JP); Tatsumi Nagasawa, Tokyo (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 346 days.

(21) Appl. No.: 13/618,964

(22) Filed: Sep. 14, 2012

(65) Prior Publication Data

US 2013/0128875 A1    May 23, 2013

(30) Foreign Application Priority Data

Nov. 22, 2011 (JP) .................. 2011-254524

(51) Int. Cl.
*H04W 4/00* (2009.01)
*H04W 36/08* (2009.01)
*H04W 36/04* (2009.01)
*H04W 36/14* (2009.01)
*H04W 84/18* (2009.01)

(52) U.S. Cl.
CPC .............. *H04W 36/08* (2013.01); *H04W 36/04* (2013.01); *H04W 36/14* (2013.01); *H04W 84/18* (2013.01)

(58) Field of Classification Search
USPC ......... 370/229, 230, 241, 252, 310, 328, 331, 370/332
See application file for complete search history.

(56) References Cited

U.S. PATENT DOCUMENTS

| 2004/0127214 | A1* | 7/2004 | Reddy et al. ............... 455/426.2 |
| 2006/0193315 | A1* | 8/2006 | Sinivaara et al. ............ 370/389 |
| 2007/0135162 | A1* | 6/2007 | Banerjea et al. ........... 455/556.1 |
| 2008/0013558 | A1* | 1/2008 | Ito et al. ....................... 370/404 |
| 2008/0062933 | A1* | 3/2008 | Liu et al. ..................... 370/332 |

(Continued)

FOREIGN PATENT DOCUMENTS

| JP | 2004-363700 | 12/2004 |
| JP | 2005-348397 | 12/2005 |

(Continued)

OTHER PUBLICATIONS

"Madonomori" NEWs, "Connectify"—Turn your Windows 7 laptop into a WiFi Hotspot, Dec. 21, 2009 http://www.forest.impress.co.jp/docs/news/20091221_338352.html.

(Continued)

*Primary Examiner* — Kwang B Yao
*Assistant Examiner* — Nguyen Ngo
(74) *Attorney, Agent, or Firm* — Anthony P. Ng; Russell Ng PLLC

(57) ABSTRACT

A method for switching access points of a wireless network via sharing communications is disclosed. A host computer and a client computer are connected to a first wireless network by a first communication system. The host computer determines a communication quality to the first wireless network. If the communication quality falls below a predetermined value, the host computer connects to a second wireless network to shift to a sharing communication mode to connect the client computer to the second wireless network. The host computer that has shifted to the sharing communication mode then connects to the client computer by a second communication system to connect the client to the second wireless network.

6 Claims, 4 Drawing Sheets

(56) References Cited

U.S. PATENT DOCUMENTS

| | | | |
|---|---|---|---|
| 2011/0134865 A1* | 6/2011 | Gaur | 370/329 |
| 2011/0201275 A1* | 8/2011 | Jabara et al. | 455/41.2 |
| 2013/0128875 A1* | 5/2013 | Kubota et al. | 370/338 |

FOREIGN PATENT DOCUMENTS

| | | |
|---|---|---|
| JP | 2007-143038 | 6/2007 |
| JP | 2007-243932 | 9/2007 |
| JP | 2008-288727 | 11/2008 |
| JP | 2010-114744 | 5/2010 |
| JP | 2010-183376 | 8/2010 |
| WO | 2010-077391 | 8/2010 |

OTHER PUBLICATIONS

Genba Oriented—"Internet sharing by E-mobile and wireless LAN", May 28, 2008 http://www.genba-oriented.jp/index.php?title=%E3%82%A4%E3%83%BC%E3%83%BB%E3%83%A2%E3%83%90%E3%82%A4%E3%83%AB%E3%81%A8%E7%84%A1%E7%B7%9ALAN%E3%81%A7%E3%82%A4%E3%83%B3%E3%82%BF%E3%83%BC%E3%83%8D%E3%83%83%E3%83%88%E5%85%B1%E6%9C%89.

* cited by examiner

METHOD AND APPARATUS FOR ACCESSING WIRELESS NETWORK BY SHARING COMMUNICATION, AND WIRELESS TERMINAL DEVICE

PRIORITY CLAIM

The present application claims benefit of priority under 35 U.S.C. §§120, 365 to the previously filed Japanese Patent Application No. JP2011-254524 with a priority date of Nov. 22, 2011, which is incorporated by reference herein.

BACKGROUND OF THE INVENTION

1. Technical Field

The present invention relates to electronic apparatuses in general, and in particular to a technique for switching access points of a wireless network via sharing communications.

2. Description of Related Art

A wireless network can be classified into a wireless personal area network (PAN), a wireless local area network (LAN), a wireless metropolitan area network (MAN), and a wireless wide area network (WAN), from a point of view of a service region reached by radio waves. These wireless networks are connected to one another via a backbone network. Each wireless network includes a wireless base station or an access point (AP) to which wireless terminal devices are wirelessly connected. When each of the wireless terminal devices is connected to the AP, the device can be connected to the other wireless terminal device connected to each wireless network, or can access each wireless network.

A round areal region defined as the radio wave reaching region covered by the AP is called a cell. The wireless LAN is formulated by IEEE 802.11WG, and the cell is comparatively small. The wireless LAN is called WiFi sometimes, because WiFi alliance provides a use compatibility to products which conform to 802.11 standard specifications and performs mutual authentication.

The wireless MAN is formulated by IEEE 802.16WG, and called WiMAX, because WiMAX forum authenticates a product that conforms to IEEE 802.16 standard specifications. A cell of WiMAX is larger than that of the wireless LAN. Mobile WiMAX has a size of a cell which is about the same as that of a cellular phone network, but has a purpose of performing data communication of a broad band in an area smaller than that of the cellular phone network.

The wireless WAN is a network built by a mobile communication company, and has communication standards such as 3G, 3.5G, and LTE (4G) formulated by 3GPP/3GPP2 of ITU-R. A cell of the wireless WAN is the largest among the cells. On a wireless terminal device such as a notebook type personal computer (hereinafter referred to as the laptop PC), a tablet terminal or a smartphone, there is mounted a wireless adapter (or network interface card) usually for connection to the wireless LAN. Moreover, on some of these devices, a wireless MAN adapter and a wireless WAN adapter are mounted in addition to the wireless LAN adapter.

When multiple wireless adapters are mounted on one laptop PC, opportunities for the connection to the wireless networks can be increased. When one user carries multiple wireless terminal devices or multiple users move together carrying the wireless terminal devices, respectively, the wireless terminal device on which the only wireless LAN adapter is mounted is to be connected to the internet via the wireless MAN or the wireless WAN in a place where there are not any access points of the wireless LAN sometimes.

On Windows® 7 of Microsoft Corporation, functions such as Virtual WiFi, SoftAP and internet connection sharing (ICS) are mounted. Virtual WiFi is a function of operating one wireless LAN adapter as a set of wireless LAN adapters by virtualization. The SoftAP is a function of emulating the function of the AP of the wireless LAN with software so as to operating as a virtual AP. The ICS is a technology in which one host to be connected to an internet service provider (ISP) is determined among a set of wireless terminal devices on which the wireless LAN adapters are mounted, so that the other wireless terminal devices which become clients can be connected to the internet through the host.

In addition, there is a technology such as My WiFi Technology (MWT) of Intel Corporation, or Wi-Fi Direct formulated by Wi-Fi Alliance which is a U.S. wireless LAN industry group, in which one wireless LAN adapter is operated as two network adapters by the virtualization with software.

SUMMARY OF THE INVENTION

In accordance with a preferred embodiment of the present disclosure, a host computer and a client computer are connected to a first wireless network by a first communication system. The host computer determines a communication quality to the first wireless network. If the communication quality falls below a predetermined value, the host computer connects to a second wireless network to shift to a sharing communication mode to connect the client computer to the second wireless network. The host computer that has shifted to the sharing communication mode then connects to the client computer by a second communication system to connect the client to the second wireless network.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Wireless Network Environment

Figure 1:
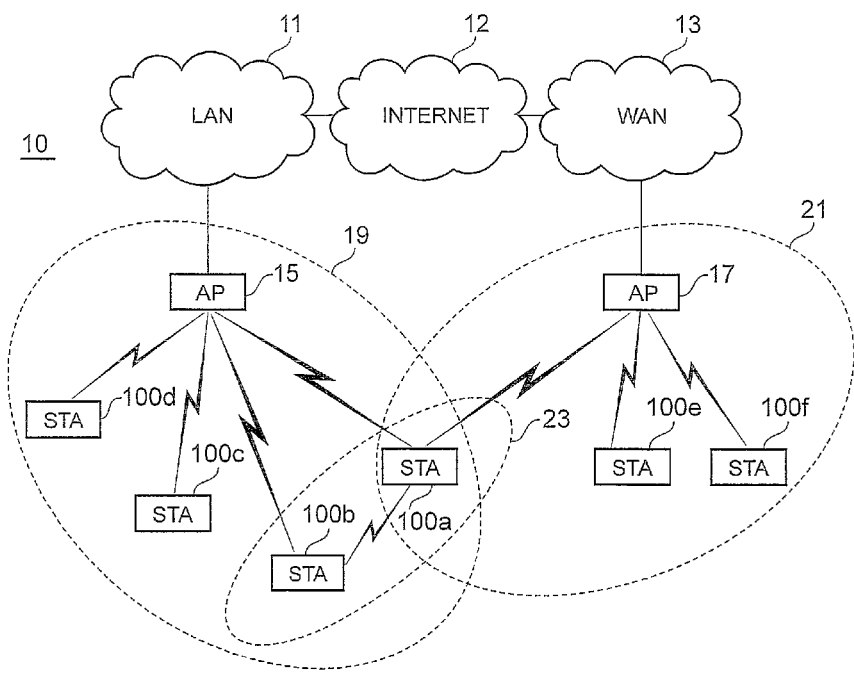
FIG. 1 shows a wireless network environment to which the present invention can be applied.

FIG. 1 illustrates a wireless network environment to which the present invention is applied. A wireless network 10 of FIG. 1 includes backbone networks of an LAN 11, an internet 12 and a WAN 13. Furthermore, FIG. 1 illustrates wireless terminal devices (STA) 100a, 100b, 100c, and 100d connected to an access point 15 of the LAN 11, and the STA 100a and STAs 100e and 100f connected to an access point 17 of the WAN 13.

The LAN 11 is a wired or wirelessly connected backbone network, and includes the AP 15 connected to the STAs in a standard stipulated by IEEE 802.11. The AP 15 is disposed not only in a specific area such as a company or home but also in a public area such as an airport or a hotel. The AP 15 is connected to the LAN 11 by wire to build a wireless LAN 19 of a infrastructure mode together with the STAs 100*a* to 100*d*. The AP in a broad sense also includes a virtual AP obtained by forming any of the STAs 100*a* to 100*d* as the AP with software, but the AP 15 shown in FIG. 1 can be distinguished as an exclusive AP in that the AP does not serve as the STA or is connected to the LAN 11 by wire.

In FIG. 1, there is also built a wireless LAN (ad hoc network) 23 connected between the STA 100*a* and the STA 100*b* in an ad hoc mode. The ad hoc network 23 is a wireless network in which the STAs are directly connected to each other not via the AP 15. The ad hoc network 23 can be built by a combination of any two of the STAs 100*a* to 100*d*, but in the present invention, the ad hoc network is built between the STA 100*a* and any one of the STAs 100*b* to 100*d*.

The WAN 13 is a wired or wirelessly connected backbone network of a communication standard different from that of the wireless LAN, and includes the AP 17. Between the AP 17 and each of the STAs 100*a*, 100*e* and 100*f*, a wireless WAN 21 is built. The STAs 100*e* and 100*f* are portable terminal devices which are described to explain the wireless network 10 and can be connected only to a WAN such as a cellular phone, and the stations are not directly concerned with the present invention. The STA 100*a* will hereinafter suitably be called the host, and the STAs 100*b* to 100*d* are called the clients, respectively.

The STA 100*a* can be connected to any one of the wireless LAN and the wireless WAN. Here, the STA 100*a* can be connected to any one of the illustrated wireless LAN 19 (AP 15) and the wireless WAN 21 (AP 17). The STAs 100*b* to 100*d* can be connected only to the wireless LAN. Here, the STAs 100*b* to 100*d* can be connected only to the illustrated wireless LAN 19 (AP 15).

The LAN 11, the Internet 12 or the WAN 13 is connected to various servers such as a Web server, a mail server, a DNS server, a DHCP server and a database server, and the other STAs which are not shown in FIG. 1. The STAs 100*a* to 100*d* can be connected to the wireless LAN 19 only when the STAs are present in a cell region of the AP 15, and the STAs 100*a*, 100*e* and 100*f* can be connected to the wireless WAN 21 only when the STAs are present in a cell region of the AP 17. When the STA 100*a* can be connected to both the wireless LAN 19 and the wireless WAN 21, a wireless network in which a radio wave intensity of the AP is high or a network in which a throughput is large can be selected from the above networks, and the station can be connected to the one selected station.

The present invention is on the assumption that the STAs 100*a* to 100*d* move together while maintaining a mutual distance in a predetermined range. Moreover, the present invention is on the assumption that the ad hoc network 23 can be built anytime by maintaining the mutual distance in the predetermined range, even when any of the STAs 100*a* to 100*d* cannot be connected to the AP 15. A cell of the AP 17 is larger than a cell of the AP 15. Therefore, when the whole group of the STAs 100*a* to 100*d* moves, any of the STAs 100*a* to 100*d* cannot be connected to the AP 15, and the only STA 100*a* can be connected to the AP 17.

B. Hardware Constitution of STA

Figure 2:
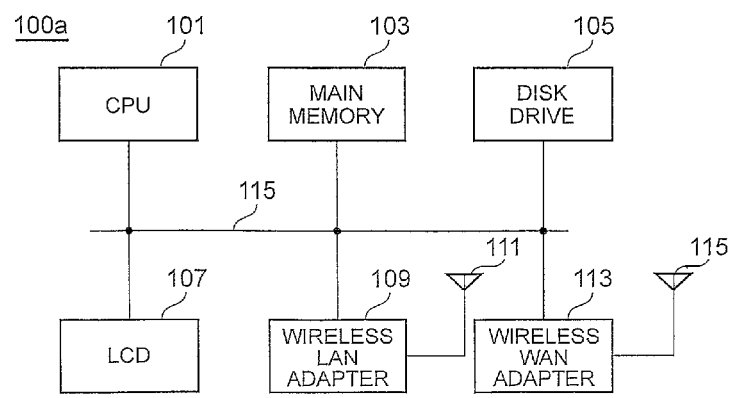
FIG. 2 is a block diagram of a host computer.

FIG. 2 is a functional block diagram showing a constitution of hardware of the STA 100*a*. In the STA 100*a*, a CPU 101, a main memory 103, a disk drive 105, an LCD 107, a wireless LAN adapter 109 and a wireless WAN adapter 113 are connected to a bus 115. In the disk drive 105, programs shown in FIG. 3, for example, an operating system (OS), an application program and a device driver are stored. The wireless LAN adapter 109 is connected to an antenna 111, and the wireless WAN adapter 113 is connected to an antenna 115.

The wireless LAN adapter 109 and the wireless WAN adapter 113 cooperate with device drivers 157 and 159 to operate a transmitter and a receiver. The wireless LAN adapter 109 and the wireless WAN adapter 113 include a buffer function when a frame is bi-directionally transferred between the bus 115 and a wireless medium. The wireless LAN adapter 109 and the wireless WAN adapter 113 further include a function of coding and modulating data to output the data as a high frequency signal to the antennas 111 and 115 at transmission, and a function of performing demodulation and error correction processing at reception. Furthermore, the wireless LAN adapter 109 and the wireless WAN adapter 113 can measure the radio wave intensity of a beacon frame received from the APs 15 and 17, or measure an error rate and an SN ratio of a communication packet.

The radio wave intensity, the error rate and the SN ratio correspond to a communication quality of the STA 100*a* to the AP 15. When the communication quality deteriorates, the throughput of the transfer frame deteriorates. The wireless LAN adapter 109 copes with virtualization by software as in Virtual WiFi, My WiFi Technology or Wi-Fi Direct. The wireless LAN adapter 109 may further correspond to a virtual AP. In an EEPROM of each of the wireless LAN adapter 109 and the wireless WAN adapter 113, an MAC address which is a unique identifier is registered by a manufacturing maker.

A constitution of the STAs 100*b* to 100*d* which operate as the clients can be described with reference to FIG. 1. The STAs 100*b* to 100*d* are different from the STA 100*a* in that the wireless WAN adapter 113 and the antenna 115 are not mounted and it is not necessary for the wireless LAN adapter 109 to cope with the virtualization by the software. In association with the present invention, a constitution of hardware of the STAs 100*a* to 100*d* is well known.

C. Software Constitution of STA

Figure 3:
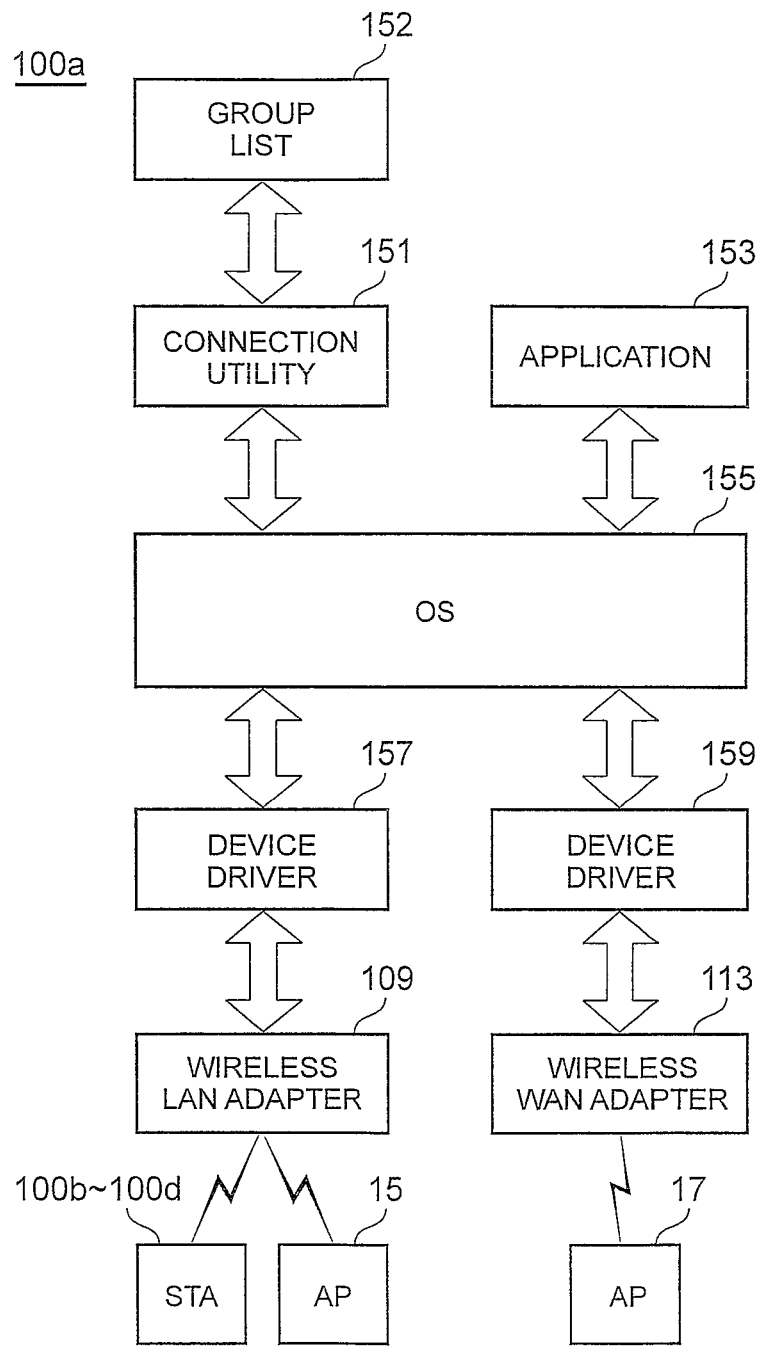
FIG. 3 is a block diagram of a software constitution of the host computer.

FIG. 3 is a block diagram explaining a schematic constitution of the software mounted on the STA 100*a*. A connection utility 151 and an application 153 are programs which operate on an OS 155. The connection utility 151 is a program which receives data concerning the measured communication quality by the wireless LAN adapter 109 from the device driver 157, evaluates the data, and instructs the OS 155 to switch an operation mode of wireless communication. The operation mode of the STA 100*a* which is instructed by the connection utility 151 includes an independent communication mode and a sharing communication mode.

The sharing communication mode in a broad sense is an operation state of the host when the host connected to two types of wireless networks of different communication standards connects the client connected to the one wireless network and the host itself to the other wireless network, and a state where the other wireless network, the host and the client communicate in the sharing communication mode is called the sharing communication.

The sharing communication of the present embodiment corresponds to a case where the STA 100*a* is connected to one or all of the STAs 100*b* to 100*d* via the ad hoc network 23, and the STA 100*a* and one or all of the STAs 100*b* to 100*d* are connected to the wireless WAN 21. The independent communication mode is an operation state where the STA 100*a* communicates in the operation mode other than the sharing communication mode, and includes a state where the STA 100*a* is connected to one of the wireless LAN 19 and the wireless WAN 21. Moreover, when the STA 100*a* is connected to the wireless LAN, there are included two states, i.e., a state where the STA is connected to the AP 15 in the infrastructure mode or connected to one or all of the other STAs 100*b* to 100*d* in the ad hoc mode, and a state where the STA is simultaneously connected to one or all of the STAs 100*b* to 100*d* and the AP 15.

The connection utility 151 manages the STAs 100*b* to 100*d* to which the sharing communication mode is allowed, by use of a group list 152. When the connection utility 151 determines that any of the STAs 100*b* to 100*d* to be provided with a sharing communication service is not present in a region reached by the radio waves of the ad hoc network 23 while operating in the sharing communication mode, the operation of the wireless LAN adapter 109 is stopped for a predetermined period of time, and then reset through the device driver 157.

In the group list 152, there is registered group information including a user ID and a password of the client provided with the sharing communication service by the host, and SSID for use in the ad hoc network 23. The registration of the group information is performed through the connection utility 151 by a manager of the host. The manager of the host faces a user of the client, or receives the information from a reliable network manager to register the group information.

The application 153 is a program to be used by the user in an operation to access the LAN 11, the internet 12 or the WAN 13, as in Web browser, mail software or animation reproduction software. The application 153 does not recognize a transfer destination of the data, but adds, to transmission data, an identifier concerned with an IP address of a transmission destination, to transmit the data to the OS 155.

The OS 155 includes a Virtual WiFi function and an ICS function mounted on Windows® 7 or functions equivalent to these functions. The OS 155 includes functions of a transport layer and an internet layer of TCP/IP protocol model hierarchy, and processes a TCP packet and an IP packet. The OS 155 acquires a global IP address for use as a transmitter from a DHCP server which is present in the LAN 11 or the WAN 17, when connected to the AP 15 or the AP 17.

At the transmission, the OS 155 adds a TCP header and an IP header to the user data prepared by the application 153 to generate the IP packet, and transfers the packet to the device drivers 157 and 159. At the reception, the OS 155 takes out the user data from the IP packet received from the device drivers 157 and 159, and transfers the data to the application 153 designated by a port number.

The OS 155 can build two virtual LAN adapters for the wireless LAN adapter 109, can perform a function of the AP in the infrastructure mode directly to the STAs 100*b* to 100*d* through the one virtual LAN adapter, and can simultaneously communicate with the AP 15 or the AP 17 by itself. Moreover, the OS 155 can communicate with the AP 15 or the AP 17 by itself while communicating directly with the STAs 100*b* to 100*d* through the ad hoc network 23 for the wireless LAN adapter 109. The OS 155 sets a time slot in which each virtual LAN adapter becomes valid, to control the transmission and reception of the frame in the wireless LAN adapter 109.

The OS 155 has a router function, and when the OS operates in the sharing communication mode, the frame received from the STAs 100*b* to 100*d* connected in the ad hoc mode via the wireless LAN adapter 109 is transferred to the wireless WAN 21 via the wireless WAN adapter 113, or frame transfer in the reverse direction is performed. The OS 155 can simultaneously be connected to the STAs 100*b* to 100*d* in the ad hoc mode to realize the sharing communication with the respective STAs. At the operation in the sharing communication mode, when the OS 155 is first connected to the STAs 100*b* to 100*d* in the ad hoc mode, a local IP address is imparted to each of these STAs. Each of the STAs 100*b* to 100*d* uses the received local IP address as the IP address of the transmitter to communicate with the STA 100*a*.

At the operation in the sharing communication mode, the OS 155 converts, into the global IP address, the local IP address of the transmitter which is included in the frame received from each of the STAs 100*b* to 100*d*, to transfer the address to the device driver 159. At the operation in the sharing communication mode, when the OS 155 determines from the MAC address that the address of the frame received from the device driver 159 is the address of one of the STAs 100*b* to 100*d*, the IP header is added to the user data by use of the local IP address of one of the STAs 100*b* to 100*d* as an address, to transfer the data to the device driver 157. The function of the OS in association with the present invention is well known.

The device driver 157 is a program which controls the operation of the wireless LAN adapter 109 or controls the data communication between the wireless LAN adapter 109 and the OS 155. The device driver 159 is similarly a program which controls the operation of the wireless WAN adapter 113 or controls the data communication between the adapter and the OS 155. The device drivers 157 and 159, the wireless LAN adapter 109 and the wireless WAN adapter 113 are positioned in a network interface layer of the TCP/IP protocol model hierarchy.

At the transmission, the device driver 157 adds Ethernet (the registered trademark) header to the IP packet received from the OS 155 to generate a frame, and transmits the frame to the AP 15 or the STAs 100*b* to 100*d* connected in the ad hoc mode through the wireless LAN adapter 109. At the reception, the device driver 157 removes the Ethernet header from the frame received from the AP 15 or one of the STAs 100*b* to 100*d* to take out the IP packet, and sends the packet to the OS 155. At the transmission, the device driver 159 adds the header of the wireless WAN to the IP packet received from the OS 155 to generate a frame, and transmits the frame through the wireless WAN adapter 113. At the reception, the device driver 159 removes the header from the frame received from the AP 17 to take out the IP packet, and sends the packet to the OS 155.

The connection utility 151 utilizes API of the device driver 157 to measure the radio wave intensity (RSSI) of the beacon frame transmitted by the AP 15, the signal to noise ratio (the SN ratio) at the data transfer or the error rate, and determines the communication quality. When the connection utility 151 determines that the communication quality deteriorates to such an extent that the throughput between the AP 15 and the STA 100*a* is influenced, the connection utility sets the access point to the wireless WAN 21 to determine whether or not the operation mode is set to the sharing communication mode. The sharing communication mode is set by connecting the wireless LAN adapter 109 to the ad hoc network via the OS 155 to start communication to the STAs 100*b* to 100*d*, or by starting the communication with the STAs 100*b* to 100*d* in the infrastructure mode including the function of the AP.

A constitution of the STAs 100*b* to 100*d* which become the clients can be described with reference to FIG. 3. The STA 100*a* is different from each of the STAs 100*b* to 100*d* in that the STAs 100*b* to 100*d* do not include the wireless WAN adapter 113 and the device driver 159. Moreover, the OS 155 does not have to correspond to the virtualization function of the wireless LAN adapter 109 and the ICS function. Furthermore, in the group list 152, the STA 100a as the host may only register the SSID for use in the ad hoc mode, its user ID and its sharing communication password.

The above software cooperates with hardware resources such as the CPU 101 and the main memory 103, to exert a function of the hardware. The connection utility 151 functions as an evaluating section which evaluates the communication quality received from the device driver 157 to output a switch signal for switching the communication mode. Furthermore, the connection utility 151 functions as an operation mode control section which determines whether to operate in the independent communication mode or the sharing communication mode in accordance with the switch signal of the evaluating section.

The OS 155 and the device driver 157 function as a communication control section which operates the wireless LAN adapter 109 and the wireless WAN adapter 113 in the independent communication mode or the sharing communication mode. The device driver 157 functions as a power control section which stops or operates the wireless LAN adapter 109 when instructed from the evaluating section.

D. Operation of Host

Figure 4:
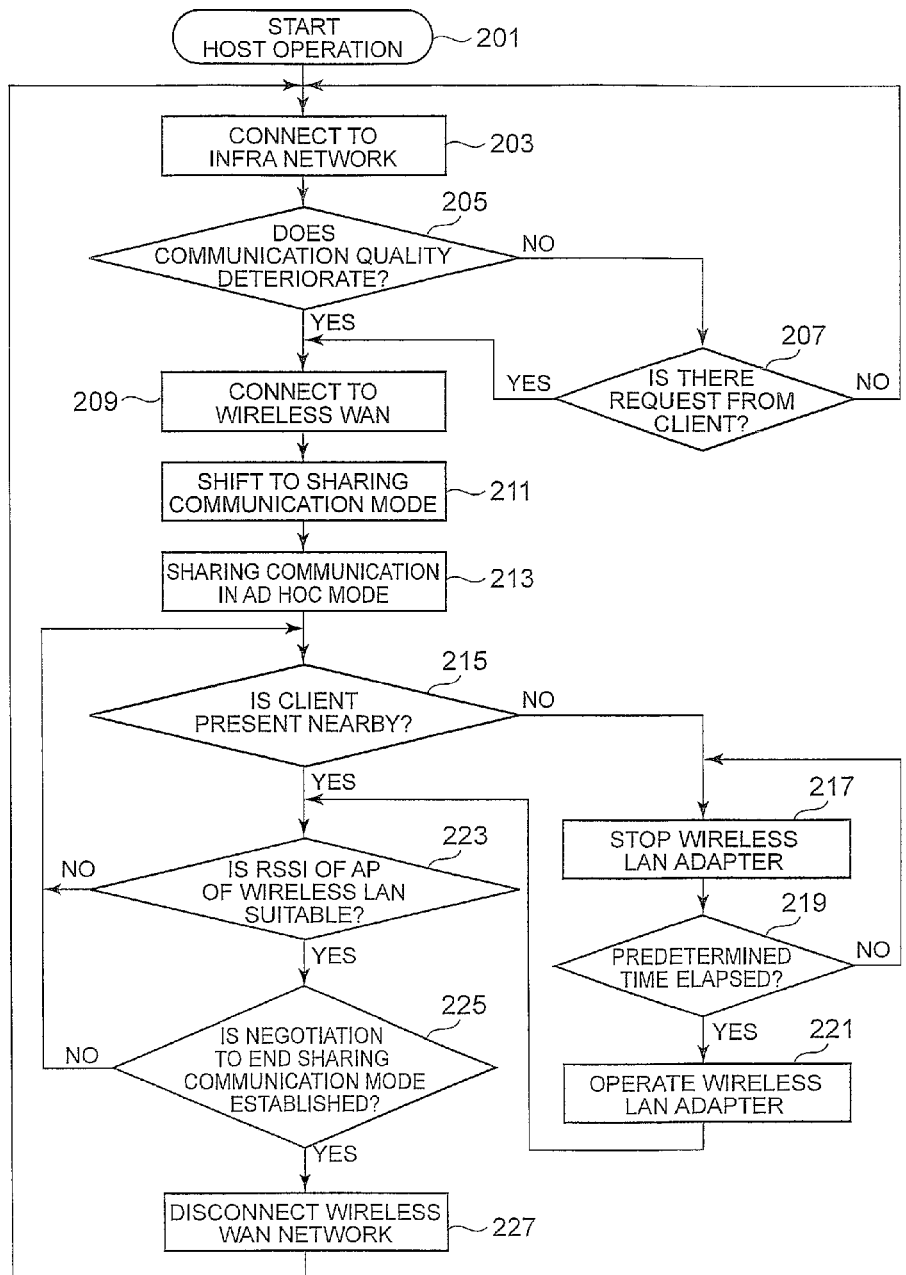
FIG. 4 is a flowchart showing an operation procedure of the host computer.

Next, an operation of the host when performing the sharing communication will be described with reference to a flowchart of FIG. 4. In a block 201, the STAs 100a to 100d start the operation. In the group list 152, the group information of the STAs 100b to 100d is registered. The user of the STA 100a adds the group information to the group list 152 through the connection utility 151, when an STA of a user who is to newly join the group or a new STA owned by itself is present. The STAs 100a to 100d move while maintaining such a mutual distance that the communication in the ad hoc mode is possible.

It is considered that in such an environment, abilities/inabilities to connect the STAs 100a to 100d to the AP 15 substantially match one another, but do not match one another sometimes, owing to a performance of each of the STAs 100a to 100d, a difference in distance to the AP 15, a difference in presence/absence of obstacles or the like. In the following procedure, when the communication quality to the AP 15 deteriorates in any of the STAs 100a to 100d, the STA 100a automatically shifts to the sharing communication mode to acquire an access of each of the STAs 100b to 100d to the wireless WAN 21.

In a block 203, the STA 100a detects the RSSI of the beacon frame periodically transmitted by the AP 15 to perform association and authentication between the STA and the AP 15, and is connected to the wireless LAN 19 in the infrastructure mode. The STAs 100b to 100d are also similarly connected to the wireless LAN 19 in the infrastructure mode. Each of the STAs 100a to 100d which communicate in the infrastructure mode acquires the local IP address from the AP 15. At this time, the ad hoc network 23 is not built between the STA 100a and each of the STAs 100b to 100d.

In a block 205, the STA 100a measures the RSSI of the beacon frame periodically transmitted by the AP 15, or measures the error rate and the SN ratio of the frame received from the AP 15, to evaluate the communication quality to the AP 15. When it is determined that the communication quality does not deteriorate, the block shifts to a block 207, and when it is determined that the quality deteriorates, the block shifts to a block 209. The block 207 indicates a procedure when one of the STAs 100b and 100c has the deteriorated communication quality prior to the STA 100a, and requests the STA 100a to switch to the sharing communication mode. The switching request of the block 207 corresponds to a procedure of a block 309 of FIG. 5.

The ad hoc network 23 can be built by any STA that is to start the communication with the other STA. In the ad hoc network 23, a peer to peer communication path is formed between the STA and the other STA present in a region reached by the radio waves of the STA which builds the ad hoc network 23. Here, the STA 100b in which the communication quality to the AP 15 in the infrastructure mode first deteriorates builds the ad hoc network 23. The STA 100b searches for the STA 100a by an active scanning system or a passive scanning system.

By the active scanning system, the STA 100b transmits a probe request frame including the SSID for use in the ad hoc mode, and the STA 100a returns a probe response frame to the request to build the ad hoc network 23. By the passive scanning system, the STA 100b detects the SSID of the beacon frame transmitted by the STA 100a to build the ad hoc network.

On confirming the password and the user ID received from the STA 100b, the STA 100a starts the communication with the STA 100b in the ad hoc mode. However, at this time, the sharing communication is not started, and hence the frame transmitted by the STA 100b is not transferred to the wireless WAN 21. When there is a request, from the STA 100b, to shift to the sharing communication mode, the block shifts to the block 209.

When there is not the request, the block returns to the block 203 in which the STA 100a maintains the connection to the wireless LAN 19 in the infrastructure mode. In the block 209, the STA 100a detects a name of a WAN communication service provider to which the AP 17 belongs, communicable RSSI, a communication mode (the 3G WAN mode, the GPRS mode, etc.) and the like. When the connection is possible, the association and authentication are performed between the STA and the AP 17, and then the STA is connected to the wireless WAN 21. At this time, the STA 100a acquires the global IP address from the DHCP server of the WAN 13. The STA 100a connected to the wireless WAN shifts to the sharing communication mode in a block 211.

The STA 100a which has shifted to the sharing communication mode through the block 207 notifies the STA 100b of the shift to the sharing communication mode in a block 213. Afterward, the STA 100b can be connected to the wireless WAN 21 through the STA 100a which operates in the sharing communication mode with the ad hoc network 23 built in the block 207. The STA 100a, which has shifted to the sharing communication mode owing to the deterioration of the communication quality of the STA 100a in the block 205, builds the ad hoc network 23 between the STA and one of the STAs 100b to 100d in the block 213, to request the sharing communication. This procedure corresponds to a procedure of a block 307 of FIG. 5.

The STA 100a periodically transmits the beacon frame including the SSID for use in the ad hoc network, to search for a communication partner by the passive scanning system. It is assumed that the STAs 100a to 100d move while keeping predetermined distances, and hence it is predicted that when the communication quality of the STA 100a to the AP 15 deteriorates, the communication qualities of the other STAs 100b to 100d also deteriorate.

The beacon frame transmitted by the STA 100a corresponds to a request to the STAs 100b to 100d present around the STA for the connection to the wireless WAN 21 by use of the sharing communication mode. Among the STAs 100b to 100d, the STA which desires to access the wireless WAN 21 by use of the sharing communication mode communicates with the STA 100a in the ad hoc mode. Alternatively, the STA 100a may transmit the probe request frame to each of the STAs 100b to 100d by use of the passive scanning system to build the ad hoc networks in order. This procedure corresponds to a block 311 of FIG. 5.

In a block 215, the STA 100a measures the RSSI of the beacon frame periodically transmitted by each of the clients 100b to 100d, and determines whether or not the client registered in the group list 152 and required to be provided with the sharing communication service is present in a region where the ad hoc network 23 can be built. When the STA 100a determines that the client is not present nearby, the block shifts to a block 217 to stop the operation of the wireless LAN adapter 109, thereby decreasing power consumption.

A block 219 shifts to a block 221 after elapse of predetermined time, to operate the wireless LAN adapter 109 again, thereby shifting to a block 223. Also when the STA 100a determines in the block 215 that the client is present nearby, the block shifts to the block 223. In the block 223, the STA 100a measures the RSSI of the beacon frame transmitted by the AP 15 to determines whether or not the STA can be connected to the wireless LAN 19 in the infrastructure mode.

When it is determined that the AP 15 cannot be connected, the block returns to the block 215 while maintaining the connection to the wireless WAN 21. When the STA 100a determines in the block 223 that the RSSI of the beacon frame transmitted by the AP 15 is not smaller than a predetermined value, in a block 225, the STA communicates with the STAs 100b to 100d present nearby in the ad hoc mode, and negotiates therewith to end the sharing communication mode. This procedure corresponds to a block 313 of FIG. 5.

There is the possibility that the STAs 100b to 100d which still determine that the RSSI of the AP 15 is small refuse to negotiate. When all the clients negotiate with the STA 100a, in a block 227, the STA 100a ends the sharing communication mode to shift to the independent communication mode. While the client which refuses to negotiate is present, the block returns to the block 215. In the block 227, the STA 100a cuts the connection to the AP 17 to shift to the block 203 in which the STA is connected to the wireless LAN 19. The throughput of the wireless LAN 19 is usually larger than that of the wireless WAN 21, and hence the STAs 100a to 100d are connected to the AP 15, so that a performance can enhance. In the above procedure, the manager or the user of the STA 100a does not have to perform any operation to switch the sharing communication mode and the independent communication mode.

E. Operation of Client

Figure 5:
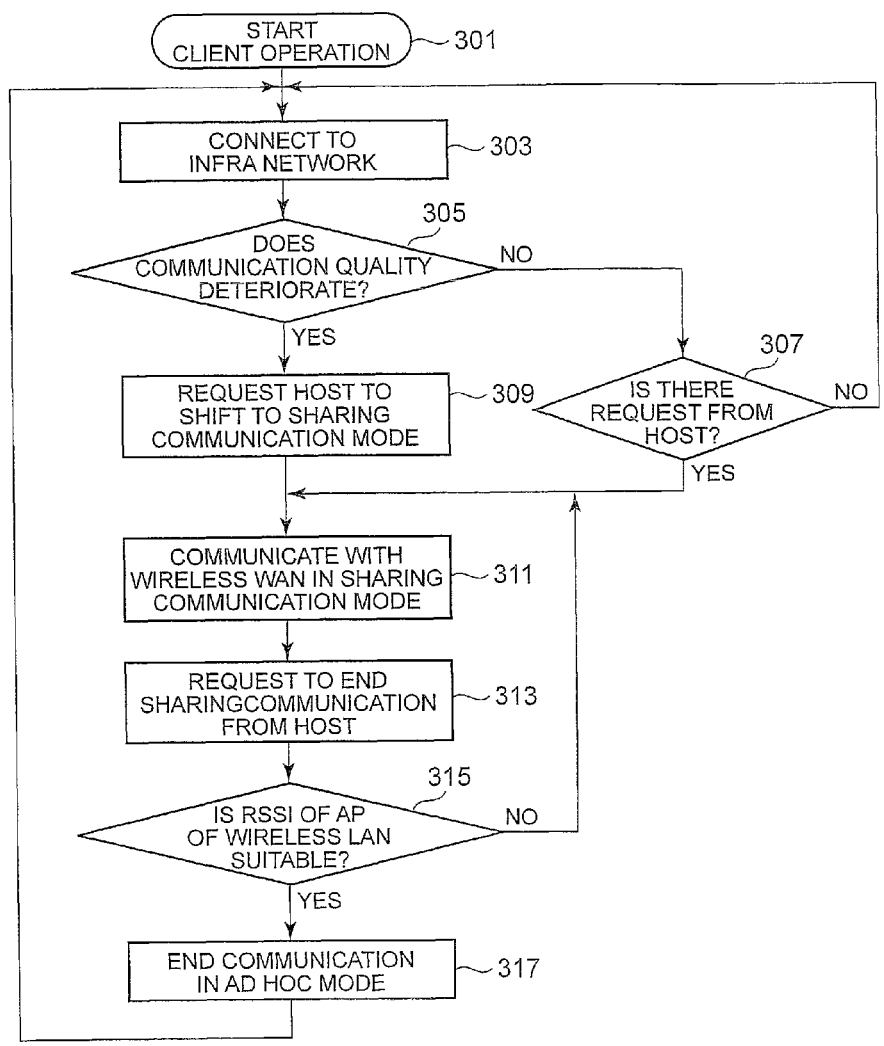
FIG. 5 is a flowchart showing an operation procedure of a client computer.

Next, an operation of the client will be described with reference to a flowchart of FIG. 5. The STAs 100a to 100d which have started the operations in a block 301 are connected to the AP 15 in a block 303. In a block 305, the STA 100b periodically monitors the communication quality to the AP 15. When it is determined in the block 305 that the communication quality does not deteriorate, the block shifts to the block 307. In the block 307, the STA 100b determines whether or not the STA 100a first has the deteriorated communication quality to the AP 15 to enter the sharing communication mode and requests the STA 100b for the sharing communication in the ad hoc mode. When there is not any request, the block returns to the block 303 to maintain the connection to the wireless LAN 19 in the infrastructure mode.

When there is the request for the sharing communication, the block shifts to the block 311. When the STA 100b determines in the block 305 that the communication quality deteriorates, in the block 309, the STA communicates with the STA 100a in the ad hoc mode, and requests the STA to shift to the sharing communication mode. This procedure corresponds to the block 207 of FIG. 4. The STA 100a which has received the request presently operates in the independent communication mode, and shifts to the sharing communication mode when the shift to the sharing communication mode is possible. In the block 311, the ad hoc network 23 is built between the STA 100a and the STA 100b, and the STA 100a shifts to the sharing communication mode. The STA 100b can access the wireless WAN 21 via the STA 100a by the sharing communication.

The block 313 shows a procedure when the STA 100a requests the STA 100b to end the sharing communication. This request corresponds to the procedure of the block 225 of FIG. 4. When there is the request, the STA 100b determines in a block 315 whether or not the RSSI of the AP 15 is not smaller than a predetermined value. When the RSSI is not smaller than the predetermined value, the STA 100b shifts to a block 317 to end the communication in the ad hoc mode, thereby returning to the block 303. When the STA 100b determines that the RSSI of the AP 15 is small, the STA 100b negotiates with the STA 100a to continue the sharing communication for a while, thereby returning to the block 311. Additionally, when the procedure of the block 313 is omitted and the STA 100b determines that the RSSI of the AP 15 is not smaller than the predetermined value, the STA may unilaterally end the communication in the ad hoc mode, and may be connected to the AP 15.

As has been described, the present disclosure provides a method and apparatus for switching access points of a wireless network via sharing communications.

Those skilled in the art will appreciate that the mechanisms of the present invention are capable of being distributed as a program product in a variety of recordable type media such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:
1. A method comprising:
connecting a host device and a client device to a first wireless network by a first communication system, wherein said host device holds a group list in which identification information of a plurality of client devices to be allowed to be connected in a sharing communication mode are registered;
determining by said host device a communication quality to said first wireless network;
in a determination that said communication quality falls below a predetermined threshold, connecting said host device to a second wireless network to shift to said sharing communication mode to connect said client device to said second wireless network;
determining by said host device whether or not said plurality of client devices registered in said group list are present in a region in which communication by a second communication system is possible, while shifting to said sharing communication mode;
in a determination that any of said client devices is not present in said region, stopping by said host device a wireless adapter to be connected to said first wireless network for a predetermined period of time; and connecting said host device that has shifted to said sharing communication mode to said client device by said second communication system to connect said client device to said second wireless network.

2. The method of claim 1, wherein said first communication system is a communication system in an infrastructure mode and said second communication system is a communication system in an ad hoc mode.

3. The method of claim 1, further comprising:

connecting said client device to said host device by said second communication system to request said host device to operate in said sharing communication mode; and shifting to said sharing communication mode by said host device in accordance with a request of said client device.

4. The method of claim 1, further comprising:

measuring by said host device an intensity of radio waves transmitted via said first wireless network while shifting to said sharing communication mode; and in a determination that said radio wave intensity is not lower than a predetermined value, negotiating by host device with said client device to end said sharing communication mode.

5. The method of claim 1, wherein said first wireless network is a wireless LAN and said second wireless network is a wireless WAN.

6. The method of claim 1, wherein a cell formed by an access point of said second wireless network is larger than a cell formed by an access point of said first wireless network.

* * * * *